A. KNOPF.
JEWELRY SNAP FASTENER.
APPLICATION FILED MAR. 26, 1920.

1,405,227.

Patented Jan. 31, 1922.

INVENTOR
August Knopf
BY
Everett H Rook.
ATTORNEYS.

UNITED STATES PATENT OFFICE.

AUGUST KNOPF, OF NEWARK, NEW JERSEY, ASSIGNOR TO FRANK WIEGAND, OF IRVINGTON, NEW JERSEY.

JEWELRY SNAP FASTENER.

1,405,227. Specification of Letters Patent. Patented Jan. 31, 1922.

Application filed March 26, 1920. Serial No. 368,820.

*To all whom it may concern:*

Be it known that I, AUGUST KNOPF, a citizen of the United States, and a resident of Newark, in the county of Essex and State of New Jersey, have invented new and useful Improvements in Jewelry Snap Fasteners, of which the following is a specification.

This invention relates in general to snap fasteners, and more particularly to snap fasteners such as are used on locket chains, necklaces, bracelets, and the like, to fasten the ends of the chains or the like together for applying the same to the wearer or removing them.

The objects of the invention are to provide a fastener of the character described and embodying a skeleton or open-work construction to serve as an effective setting for gems or precious stones, and admitting light beneath the gems to produce a brilliant lustre and enhance the appearance of the gems; to provide a fastener for locket chains, necklaces and the like formed of a pair of relatively slidable but inseparable parts whereby the ends of the chain or the like may be separated by slight relative movement of the parts of the fastener; to provide such a fastener in which one part serves as a closure for a hook carried by the other part to normally prevent disconnection of the end of the chain from the hook; to provide fastening means for normally preventing relative sliding of the parts of the fastener; to secure simple and novel means for limiting the sliding movement of the parts of the fasteners and prevent separation thereof; to provide a fastener of this character which embodies a minimum amount of material and which is simple and reliable in construction and operation; and to obtain other advantages and results as may be brought out by the following description.

Referring to the accompanying drawings, in which like numerals of reference indicate the same parts throughout the several views.

Figure 1:
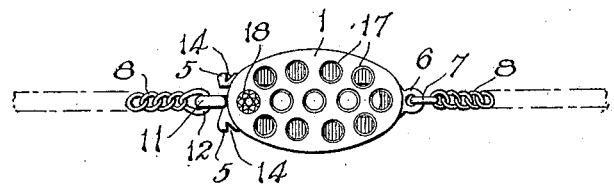
Figure 1 is a top plan view of a snap fastener embodying my invention showing the fastener in closed position.
Figure 2:
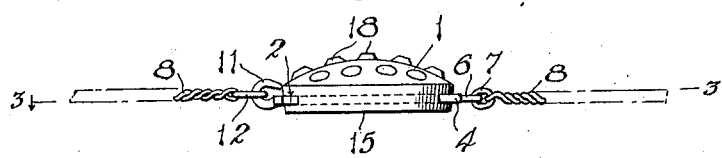
Figure 2 is a side elevation thereof.
Figure 3:
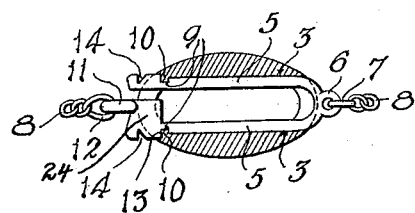
Figure 3 is a horizontal sectional view taken on line 3—3, Fig. 2.
Figure 4:
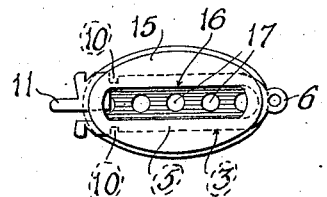
Figure 4 is a bottom plan view thereof.

In the embodiment of the invention shown by Figures 1-6 inclusive the numeral 1 designates the body portion of the fastener, which in the present instance is shown as substantially elliptical or oval in configuration, the said body portion being provided with a slideway 2 intermediate its thickness, said slideway being arranged parallel to the major axis of the body portion and having a pair of spaced and parallel guide grooves 3 in which is slidably mounted a fastener slide 4.

This fastener slide 4 is substantially flat and U-shaped in formation, the arms 5 thereof being resilient and springing into the guide grooves 3 and frictionally engaging the same, the ends of the slide 4 when the slide is in a normally closed position within the body portion 1 projecting beyond the ends of the body portion. The closed end of the slide 4 is provided with an eye 6 to which is permanently secured one end 7 of the locket chain or necklace 8. Adjacent the other ends of the arms 5 of the slide are formed notches 9 adapted to receive lugs 10 projecting inwardly from the ends of the guide grooves 3, the said notches 9 and lugs 10 when in engagement serving to lock the slide 4 within the body portion and prevent sliding movement thereof. The free extremity of one of the arms 5 of the slide 4 is provided with a hook 11 to which is adapted to be fastened by means of a ring 12 the opposite end of the chain or necklace 8, the end of said hook being adapted to engage the end of the body portion 1 to prevent disconnection of the ring 12 from the hook when the slide 4 is in closed position with the lugs 10 engaging the notches 9. This hook 11 may also serve as a stop to limit the sliding movement of the slide 4 into the body portion, or the arms of the slide may be provided with shoulders 13 adapted to engage the ends of the guide grooves 3 to limit such movement.

For the purpose of facilitating the sliding of the fastener slide 4 in the body portion the free extremities of the arms 5 are provided with finger nail notches 14 by means of which the slide 4 may be grasped.

Where the shoulders 13 serve to limit sliding, they project further apart than the arms 5, 5 so that the notches 9 can be cleared from the lugs 10 without disengaging the limiting shoulders 13, and to prevent any possibility of the limiting shoulders being pinched near enough together to allow the slide to escape from the slideway, a stop 24, (see Figure 3), is provided between the arms to limit their approach to each other so that while they may be compressed near enough for the recesses 9 to clear the lugs 10 the shoulders 13 never permit the slide to pass them.

Figure 5:
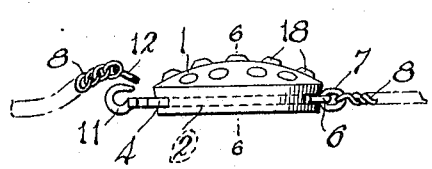
Figure 5 is a side elevation showing the fastener in an open position.
Figure 6:
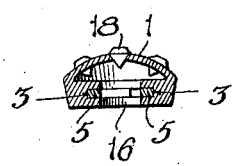
Figure 6 is a transverse vertical sectional view on the line 6—6 of Fig. 5.

Assuming the slide 4 to be in a closed position as shown by Figures 1-4 inclusive, and that it is desired to secure the ring 12 upon the hook 11, the slide 4 is grasped by the fingers of the operator in the notches 14 and the arms 5 of the slide pressed toward each other which releases the notches 9 from the lugs 10. The slide 4 is then pulled outwardly until movement is stopped by engagement of the end 7 of the chain 8 with the corresponding end of the body portion 1, as shown by Figure 5, whereupon the hook 11 is moved away from the end of the body portion 1 so that the ring 12 can be inserted in the hook. The slide is then pushed in the opposite direction into the body portion 1 until the shoulders 13 or the hook 11 engage the end of the body portion 1, which limits the movement of the slide 4 in this direction, and the spring action of the arms 5 then causes the notches 9 to snap over the lugs 10 to lock the slide 4 in the body portion. It will thus be seen that the two members 1 and 4 comprising the fastener are not separated at any time for the purpose of disconnecting the ends of the chain 8, and that a very slight movement of the fastener slide 4 is required to enable the ring 12 to be removed from the hook 11. The end of the body portion 1 serves as a closure for the hook 11 when the fastener is in a closed position, and the end 7 of the chain limits of the movement of the slide 4 toward the unlocked position.

One object of this construction is to adapt the fastener as a gem setting, and for this purpose the under side 15 of the body portion 1 is provided with a cut away portion or opening 16 of a width substantially equal to the distance between the arms 5 of the slide 4, and of a length equal to substantially the length of the body portion 1. The opposite side of the body portion is provided with a plurality of gem-receiving openings 17 adapted to serve as settings for suitable gems 18, and it will thus be seen that light is admitted through the opening 16 under the gems 18 so as to enhance the brilliancy and lustre of the gems.

Figure 7:
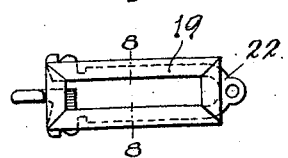
Figure 7 is a plan view of a modified form of the fastener.
Figure 8:
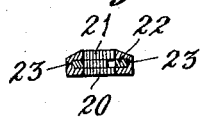
Figure 8 is a transverse sectional view on the line 8—8 of Fig. 7.

The configuration of the body portion 1 of the fastener may be varied in numerous ways, and one modification of the same is shown by Figures 7 and 8 in which the body portion 19 is substantially rectangular and is provided at one side thereof with an opening 20 corresponding to the opening 16 of the body portion 1, and at the opposite side thereof with an opening 21 adapted to receive a gem or the like. The fastener slide 22 is identical in construction and operation with the fastener slide 4 above described, and is mounted in guide grooves 23 formed in the body portion 19 similarly to the guide grooves 3 of the body portion 1. It will also be noted that this skeleton like construction reduces the amount of material used in the construction of the fastener and also reduces the weight and bulk thereof, thus producing a comparatively inexpensive fastener.

Obviously many modifications and changes can be made in the construction of my improved fastener by those skilled in the art without departing from the spirit or scope of the invention, and I do not desire to be limited in the use of my invention except as required by the following claims when construed in the light of the prior art.

Having thus described the invention, what I claim is:

1. In a fastener of the character described, the combination of a body portion providing a slideway, a slide in said slideway, locking means always enclosed by the body portion and normally holding the slide against movement, means for unlocking said slide, and means at the opposite ends of the slide for attaching the ends of a chain.

2. In a fastener of the character described, the combination of a body portion providing a slideway open at its opposite ends, a slide having a lateral arm in said slideway adapted to resiliently engage therewith to prevent sliding, and means at the opposite ends of said slide for attaching the ends of a chain thereto independent of said slideway.

3. In a fastener of the character described, the combination of a body portion providing a slideway open at its opposite ends, a doubled slide in said slideway having near the free end of one of its arms means for engagement with the body portion to prevent sliding, and means at the end of the other arm and at the doubled end of the slide for attaching the ends of a chain thereto independent of said slideway.

4. In a fastener of the character described, the combination of a body portion providing a slideway open at its opposite ends, a U-shaped slide having near the free end of one of its arms means for engagement with the body portion to prevent sliding, and means at the end of the other arm and at the doubled end of the slide for attaching the ends of a chain thereto independent of said slideway.

5. In a fastener of the character described, the combination of a body portion providing a slideway, a slide in said slideway, locking means always enclosed by the body portion and normally holding the slide against movement, means for unlocking said slide, stops on said slide for limiting sliding thereof, and means at the opposite ends of the slide for attaching the ends of a chain.

6. In a fastener of the character described, the combination of a body portion providing a slideway, a slide in said slideway having resiliently diverging arms, cooperating means on one of said arms and the body portion for preventing sliding, means on the slide for limiting sliding, stop means on the arms for preventing release of said limiting means, and means at opposite ends of the slide for attaching the ends of a chain.

7. In a fastener of the character described, the combination of a body portion having an opening transversely therethrough and a longitudinally extending slideway, and a fastener slide mounted in said slideway and surrounding the said transverse opening whereby light is admitted through the said body portion.

8. In a fastener of the character described, the combination of a body portion having an opening transversely therethrough and a longitudinally extending slideway, and a U-shaped fastener slide mounted in said slideway with its arms arranged upon opposite sides of said transverse opening in the body portion to admit light through said transverse opening.

9. In a fastener of the character described, the combination of a body portion having an opening transversely therethrough and a longitudinally extending slideway, and a fastener slide mounted in said slideway and surrounding the said transverse opening whereby light is admitted through the said body portion, said fastener slide being provided at one end thereof with an eye, and at the other end thereof with a hook.

AUGUST KNOPF.